United States Patent
Fromherz et al.

(10) Patent No.: US 7,089,221 B2
(45) Date of Patent: Aug. 8, 2006

(54) FEEDBACK CONTROL OF PROBLEM SOLVING

(75) Inventors: Markus P. J. Fromherz, Palo Alto, CA (US); Lara S. Crawford, Mountain View, CA (US); Yi Shang, Columbia, MO (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 521 days.

(21) Appl. No.: 10/602,193

(22) Filed: Jun. 24, 2003

(65) Prior Publication Data

US 2004/0267680 A1   Dec. 30, 2004

(51) Int. Cl.
*G06N 5/00* (2006.01)

(52) U.S. Cl. .............................. 706/46; 706/19; 706/45; 706/60

(58) Field of Classification Search .................. 706/13, 706/46, 19, 45, 60, 14; 370/216
See application file for complete search history.

(56) References Cited

U.S. PATENT DOCUMENTS

| | | | | |
|---|---|---|---|---|
| 5,136,686 A | * | 8/1992 | Koza ............................ | 706/13 |
| 5,148,513 A | * | 9/1992 | Koza et al. .................... | 706/13 |
| 5,390,282 A | * | 2/1995 | Koza et al. .................... | 706/13 |
| 5,870,731 A | | 2/1999 | Trif et al. ...................... | 706/52 |
| 6,088,690 A | | 7/2000 | Gounares et al. .............. | 706/13 |
| 6,144,923 A | | 11/2000 | Grosse .......................... | 702/56 |
| 6,144,953 A | * | 11/2000 | Sorrells et al. ................ | 706/60 |
| 6,665,262 B1 | * | 12/2003 | Lindskog et al. ............ | 370/216 |
| 6,865,562 B1 | * | 3/2005 | Fromherz et al. ............. | 706/14 |
| 6,912,515 B1 | * | 6/2005 | Jackson et al. ................ | 706/19 |

OTHER PUBLICATIONS

U.S. Appl. No. 09/874,167, filed Jun. 4, 2001, Markus P.J. Fromherz et al.
U.S. Appl. No. 09/874,552, filed Jun. 4, 2001, Warren B. Jackson et al.

(Continued)

*Primary Examiner*—Wilbert L. Starks, Jr.
(74) *Attorney, Agent, or Firm*—Linda M. Robb

(57) ABSTRACT

A method for feedback control of cooperative problem solving for real-time applications in complex systems utilizes solvers parameterized by control variables. The method includes initializing the time setting and selecting at least one solver parameter value. The solver is operated with the selected solver parameter value or values for a specified interim and the operational conditions are reviewed. A solution is transmitted to the system if a solution quality condition is satisfied. The solver continues to operate if the solution quality condition is not satisfied and the performance differential is not greater than a specified threshold. If the solution quality condition is unsatisfied, but the performance differential exceeds the threshold, at least one alternate solver parameter value is selected and the solver is operated with the new solver parameter value for a specified interim. The solver continues to operate until the solution quality condition is satisfied.

31 Claims, 7 Drawing Sheets

OTHER PUBLICATIONS

S. Baluja, A.G. Barto, K.D. Boese, J. Boyan, W. Buntine, T. Carson, R. Caruana, D.J. Cook, S. Davies, T. Dean, T.G. Dietterich, P.J. Gmytrasiewicz, S. Hazlehurst, R. Impagliazzo, A.K. Jagota, K.E. Kim, A. McGovern, R. Moll, A.W. Moore, E. Moss, M. Mullin, A.R. Newton, B.S. Peters, T.J. Perkins, L. Sanchis, L. Su, C. Tseng, K. Turner, X. Wang, D.H. Wolpert, Statistical Machine Learning for Large-Scale Optimization, Neural Computing Surveys, 2000, 3:1-58.

J.E. Borrett, E.P.K. Tsang, N.R. Walsh, Adaptive Constraint Satisfaction: The Quickest First Principle, Technical Report CSM-256, University of Essex Department of Computer Science, 1995.

J.A. Boyan, A.W. Moore, Learning Evaluation Funcitons to Improve Optimization by Local Search, Journal of Machine Learnaing Research, 2000, 1:77-112.

A.E. Eiben, R. Hinterding, Z. Michalewicz, Parameter Control in Evolutionary Algorithms, IEEE Transactions on Evolutionary Computation, 1999, 3:124-141.

B. Hnich, P. Flener, High-Level Reformulation of Constraint Programs, Proceedings of the Tenth International French Speaking Conference on Logic and Constraint Programming, 2001, p. 75-89.

* cited by examiner

FEEDBACK CONTROL OF PROBLEM SOLVING

This work was funded in part by the Defense Advanced Research Projects Agency (DARPA), Contract #F33615-01-C-1904. The U.S. Government may have certain rights in this subject matter.

INCORPORATION BY REFERENCE

The following U.S. patent applications are fully incorporated herein by reference: U.S. application Ser. No. 09/874,552, filed Jun. 4, 2001, ("Method and System for Algorithm Synthesis in Problem Solving"); and U.S. application Ser. No. 09/874,167, filed Jun. 4, 2001, ("Adaptive Constraint Problem Solving Method and System").

BACKGROUND

This disclosure relates generally to the field of computerized problem solving and in particular to a system and method for tuning solving behavior by utilizing resource bounds.

In certain control system applications, there exists a significant need for systems which can provide satisfactory decisions in critically time-constrained situations for complex systems having subsystems consisting of many networked sensors and actuators, with each subsystem having control, monitoring and fault diagnosis capabilities. Advances in hardware technology, such as inexpensive processors, low-cost micro-electromechanical systems (MEMS) actuators and sensors, and decreasing communication costs, result in systems with unprecedented reconfigurability, flexibility, and robustness. Such applications would benefit from the use of generic problem solvers, such as constraint solvers, to improve fault tolerance and reconfigurability. However, such problem solvers are typically not able to adapt their execution to or even execute within the resource bounds of the applications, such as time and memory limits.

One problem solving technique for such systems is off-line adaptive problem solving, or what might be called open-loop control of solving, in which some parameters are learned off-line and the solver is then run with different parameter values depending on the problem instance. Various approaches have utilized feedback-type information, such as that suggested by Borrett, Tsang and Walsh. in "Adaptive Constraint Satisfaction: the Quickest First Principle", Technical Report CSM-256, University of Essex Department of Computer Science, 1995, which uses on-line performance feedback to switch between solving algorithms, or Horvitz, Ryan, Gomes, Kautz, Selman and Chickering, "A Bayesian Approach to Tackling Hard Computational Problems", *Proceedings of the Seventeenth Conference on Uncertainty and Artifical Intelligence*, Seattle, Wash., August 2001, which use it as part of a dynamic restart policy.

There are also a variety of approaches that dynamically build up estimates of value or cost functions to guide the search, such as Baluja et al., "Statistical Machine Learning for Large-scale Optimization", *Neural Computing Surveys*, 3:1–58, 2000. In this case, functions are measurements of the "goodness" of particular states or action choices, and are developed on-line using accumulated performance data. In the evolutionary algorithms community, a variety of techniques have been used to adapt genetic operators and parameters based on various performance measures, as in Eiben, Hinterding, and Michalewicz, "Parameter Control in Evolutionary Algorithms", *IEEE transactions on evolutionary computation*, 3:124–141, 1999. Similar approaches have been used with other techniques, such as simulated annealing, as in Wah & Wang, "Tuning Strategies in Constrained Simulated Annealing for Nonlinear Global Optimization", *International Journal of Artificial Intelligence Tools*, 9(1), 2000.

Such techniques have also been used to modify the problem representation, as in the "open-loop" off-line design approach for problem reformulation proposed by Hnich and Flener in "High-level Reformulation of Constraint Programs", *Proceedings of the Tenth International French Speaking Conference on Logic and Constraint Programming*, pages 75–89, 2001. Feedback approaches have been used as well. For example, Pemberton and Zhang, "$\epsilon$-transformation: Exploiting Phase Transitions to Solve Combinatorial Optimization problems", *Artificial Intelligence* 81(1–2):297–325, 1996, uses (open-loop) phase transition information and on-line branching estimation to identify complex search problems and transform them into easier searches producing sub-optimal solutions. Modification of penalty weights or chromosome representations in response to performance has also been explored in the evolutionary algorithms community by Eiben et al., "Parameter Control in Evolutionary Algorithms".

However, these techniques do not utilize a generic framework, nor are they time-bounded, explicitly taking a time bound, a time value by when a solution must be computed, into account when selecting solver parameter values. Although some of these techniques represent anytime algorithms that can be stopped when a time bound is reached, the time bound is not considered earlier. Additionally, none of these techniques consider resource limits such as limits in computing memory.

BRIEF SUMMARY

Briefly stated, the disclosed embodiments provide examples of improved approaches to the problems noted hereinabove in the "Background" discussion and the art cited therein. There is shown in these examples an improved method for feedback control of cooperative problem solving, which may provide some or all of the following features: operating a cooperative solver with at least one selected solver parameter value and reviewing operational conditions, transmitting a solution to the system if a solution quality condition is satisfied, continuing to operate if the solution quality condition is not satisfied and the performance differential is not greater than a specified threshold, selecting at least one alternate solver parameter value if the solution quality condition is unsatisfied but the performance differential exceeds the threshold, and operating the solver with the new solver parameter value until the solution quality condition is satisfied.

There is also shown in these examples an improved system for feedback control of cooperative problem solving, which may provide some or all of the following features: means for operating a cooperative solver with at least one selected solver parameter value and reviewing operational conditions, means for transmitting a solution to the system if a solution quality condition is satisfied, means for continuing to operate if the solution quality condition is not satisfied and the performance differential is not greater than a specified threshold, means for selecting at least one alternate solver parameter value if the solution quality condition is unsatisfied but the performance differential exceeds the threshold, and means for operating the solver with the new solver parameter value until the solution quality condition is satisfied.

There is shown in these examples an improved article of manufacture in the form of a computer usable medium having computer readable program code embodied within it, such that the program code causes a computer to perform method for feedback control of cooperative problem solving, which may provide some or all of the following features: operating a cooperative solver with at least one selected solver parameter value and reviewing operational conditions, transmitting a solution to the system if a solution quality condition is satisfied, continuing to operate if the solution quality condition is not satisfied and the performance differential is not greater than a specified threshold, selecting at least one alternate solver parameter value if the solution quality condition is unsatisfied but the performance differential exceeds the threshold, and operating the solver with the new solver parameter value until the solution quality condition is satisfied.

BRIEF DESCRIPTION OF THE DRAWINGS

The foregoing and other features of the instant method and system will be apparent and easily understood from a further reading of the specification, claims and by reference to the accompanying drawings in which:

DETAILED DESCRIPTION

Figure 1:
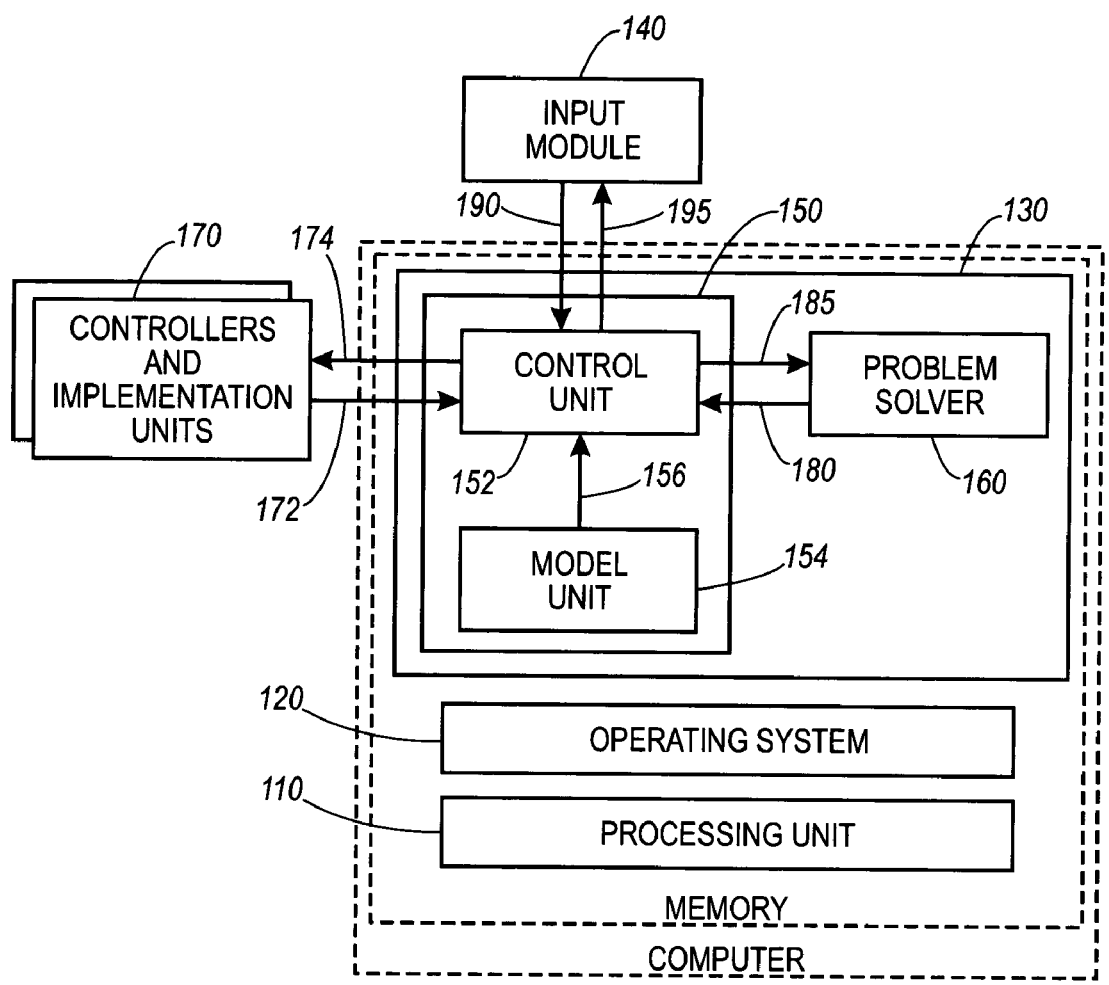
FIG. 1 is a schematic of a representative system incorporating an adaptive constraint solver capable of supporting feedback control of problem solving.

Solvers often have different on-line performance profiles (convergence behavior) depending on certain parameters. For example, given different encodings of the problem, a solver may produce a solution faster at the expense of solution quality. Sample encodings resulting in faster but lower-quality solutions are a coarser domain granularity in a finite-domain solver or a larger improvement termination criterion in a continuous solver. Given a deadline td by which a solution has to be found, it would be desirable to choose those solver parameters which would return the best solution by that deadline. Furthermore, if the chosen solver instantiation doesn't behave as expected (i.e., doesn't converge as fast as expected), it would be desirable to change the solver parameters on-line, during solving and before the deadline.

As another example, global and local solvers also have different on-line performance profiles. Global solvers typically converge slowly to the optimal solution, while local solvers improve faster initially but become mired in local optima. Again, a solver should be chosen depending on the expected solution quality at time td, and again, since the average behavior of global and local solvers may be different from their behavior on a particular problem, it would be desirable to change this behavior on-line. For example, if global solving converges more slowly than expected, restarting global solving, possibly multiple times, and eventually even switching to local solving may be desirable.

For constrained optimization under time bounds, the goal is finding the best possible solution, i.e., a feasible point with the smallest objective value, within a time bound. Combining different types of solvers, such as the ones searching in difference spaces, can lead to significant performance improvement. For example, in a cooperative solver consisting of an unconstrained and a constrained optimizer, the unconstrained optimizer is run first for some time to minimize a penalty function, which is a sum of the objective and constraint violations. The point found by this optimizer is then used as the starting point of the constrained optimizer. In this example, open-loop-control issues include solver selection and solver parameter initialization. For the cooperative solver, it is necessary to decide when to stop the first solver and start the second solver. While a complexity diagram gives the average behavior, for a particular instance, the actual behaviors of the two solvers are unknown. Closed-loop control is necessary to better select the transition point of the two methods, which improves result quality under the time bound. The approach described herein uses time and resource constraints explicitly in selecting the appropriate solvers and adaptively controls the cooperation of multiple solvers.

Various computing environments may incorporate feedback control of problem solving of the subject method. The following discussion is intended to provide a brief, general description of suitable computing environments in which the method may be implemented. Although not required, the method will be described in the general context of computer-executable instructions, such as program modules, being executed by a networked computer. Generally, program modules include routines, programs, objects, components, data structures, etc. that perform particular tasks or implement particular abstract data types. Moreover, those skilled in the art will appreciate that the method may be practiced with other computer system configurations, including hand-held devices, multi-processor systems, microprocessor-based or programmable consumer electronics, networked PCs, minicomputers, mainframe computers, and the like. The method may also be practiced in distributed computing environments where tasks are performed by remote processing devices that are linked through a communications network. In a distributed computing environment, program modules may be located in both local and remote memory storage devices.

Although the method for feedback control of problem solving described herein is not limited to embedded applications, the following discussion will pertain to embedded systems for purposes of example only. One skilled in the art will appreciate that the method for feedback control of problem solving is useful for many complex control problems, generic software solutions to a wide variety of programming problems, and flexible programs that separate the model from its solution. Additionally, it may be practiced in a multitude of computing environments.

FIG. 1 illustrates one example of how feedback control of problem solving is implemented with selected modules of an embedded computer system that is an integral part of a larger computing system or machine. Embedded systems are used to control, monitor or assist an operation being performed by equipment interfacing with the computer system. Typically, an embedded system is housed on a microprocessor board with Read Only Memory (ROM) for storing the programs and Random Access Memory (RAM) for program execution data. Examples of devices utilizing embedded systems include printers, cameras, watches, microwaves, video cassette recorders, automobiles, engineering tools, process control systems, and office and consumer products. Some embedded systems include an operating system, but many are so specialized that the entire logic can be implemented as a single program. Embedded systems may also be controlled by external software, as in a client/server environment. However, embedded systems present resource constraints, such as less memory and a slower processor, which limit their capabilities. The problem solver described herein is able to operate within these resource constraints and increase the functionality of the system by providing the capability of taking into account a wider array of objectives and constraints for the performance of tasks being directed by the system. It gives the system the flexibility of operating in real time with more complex system constraints than is possible with existing systems.

It will be recognized that a computing environment may include various modules, such as a processing unit, system memory, a system bus coupling various system components to the processing unit, an input/output system, a hard disk drive, an optical disk drive, program modules, program data, monitor, various interfaces, peripheral output devices, and/or networked remote computers. However, for the purpose of clarity, FIG. 1 illustrates only those modules within the computing environment which interact with the feedback control problem solving program. In particular, the feedback control problem solving program resides within a computing module, which includes a processing unit 110, operating system 120, applications module 130 and memory module. The memory module may be comprised of one or more of disk storage, tape storage, magnetic media, non-volatile memory, EPROM memory, EEPROM memory, FLASH memory, DRAM memory, SRAM memory, ROM, CD memory, computer memory, and/or any like memory system or device. Applications module 130 may perform many possible tasks, such as configuration management, coordination (directing the interaction of multiple hardware components), planning, scheduling, predictive observer (monitoring a hardware component, extrapolating future behavior from past behavior, and outputting the predicted behavior), system control, and diagnostics. The embodiments of the applications module described herein are exemplary only and do not limit the function of the applications module to those specific tasks.

In this embodiment, applications module 130 includes controller module 150 and problem solver program 160, which includes the feedback control program. Within controller module 150 resides control unit 152, which communicates with model unit 154 through path 156. Path 156 provides control unit 152 with instructions concerning the constraints, such as hardware constraints, within the system and secondary goals for the task to be performed, for example conserving energy or maintaining moving parts at a constant velocity. Control unit 152 communicates with input module 140 through input path 190 and output path 195. Input path 190 provides control unit 152 with instructions as to the primary goal or goals of a task to be performed, for example moving a sheet of paper within a specified time frame or coordinating the movement of vehicles geographically. Output path 195 provides input module 140 with feedback as to an error in the execution of the task, such as when the goal or goals could not be achieved. The error specifies the deviation of the actual state or behavior from the goal state or behavior.

The feedback control problem solver program 160 is interconnected to controller module 150 through control paths 180 and 185. Control path 185 provides feedback control problem solver program 160 with the goals and constraints to be imposed on the system and information on the current state of the implementation units. Control path 180 provides control unit 152 with the solution for the problem presented. The solution sent on control path 180 is time-critical, i.e., it has to be delivered in a timely manner (for example, once a second or once a millisecond), otherwise control will deteriorate. Control unit 152 is interconnected to various implementation units 170 through sensor path 172 and control path 174. Sensor path 172 provides the controller with information as to the current state of implementation units 170. Control path 174 provides a control signal to implementation units 170 after receipt of the problem solution from feedback control problem solver 160. Additionally, input module 140 may be connected to model unit 154 through an additional input path, not shown, to provide the capability to modify the constraints or secondary goal input from model unit 154 to control unit 152.

Figure 2:
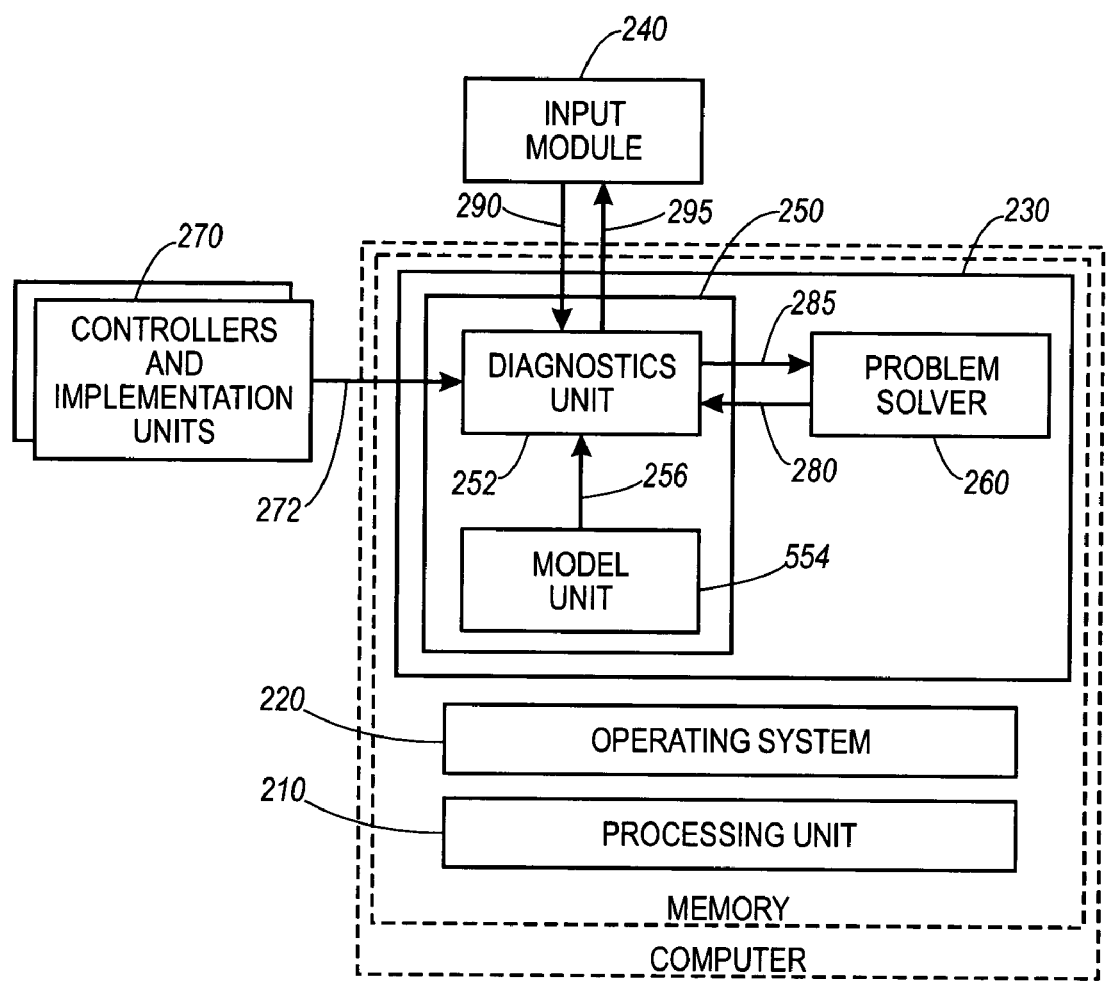
FIG. 2 is a schematic of another representative system incorporating an adaptive constraint solver capable of supporting feedback control of problem solving.

Referring now to FIG. 2, there is shown a second example of how the adaptive constraint problem solver program interacts with modules of a general purpose computing system. Again, for the purpose of clarity, FIG. 2 illustrates only those modules within the computing environment which interact with the constraint problem solving program. Other modules such as those described above may be part of the system. The constraint problem solving program resides within a computing module, which includes a processing unit 210, operating system 220, and applications module 230. In this embodiment, applications module 230 includes diagnostics module 250 and problem solver program 260, which includes the feedback control program. Within diagnostics module 250 resides diagnostics unit 252, which communicates with model unit 254 through path 256. Path 256 provides diagnostics unit 252 with instructions concerning task constraints, such as hardware constraints, within the system and secondary goals for the task to be performed, for example, conserving energy. Diagnostics unit 252 communicates with input module 240 through input path 290 and output path 295. Input path 290 provides diagnostics unit 252 with instructions as to the primary fault or faults to be monitored, for example, deviations in the speed of a wheel driven by a motor from the expected speed (because of slippage). Output path 295 provides input module 240 with feedback as to current system status and its deviation from normal behavior. The adaptive constraint problem solver program 260 is interconnected to diagnostics module 250 through paths 280 and 285. Path 285 provides feedback control problem solver program 260 with the goals and constraints to be imposed on the system and information on the current state of the implementation units. Path 280 provides diagnostics unit 252 with the solution for the problem presented. The solution sent on control path 280 is time-critical, i.e., it has to be delivered in a timely manner (for example, once a second or once a millisecond), otherwise control will deteriorate. Diagnostics unit 252 is interconnected to various implementation units 270 through sensor path 272. Sensor path 272 provides diagnostics unit 252 with information as to the current state of implementation units 270.

Figure 3:
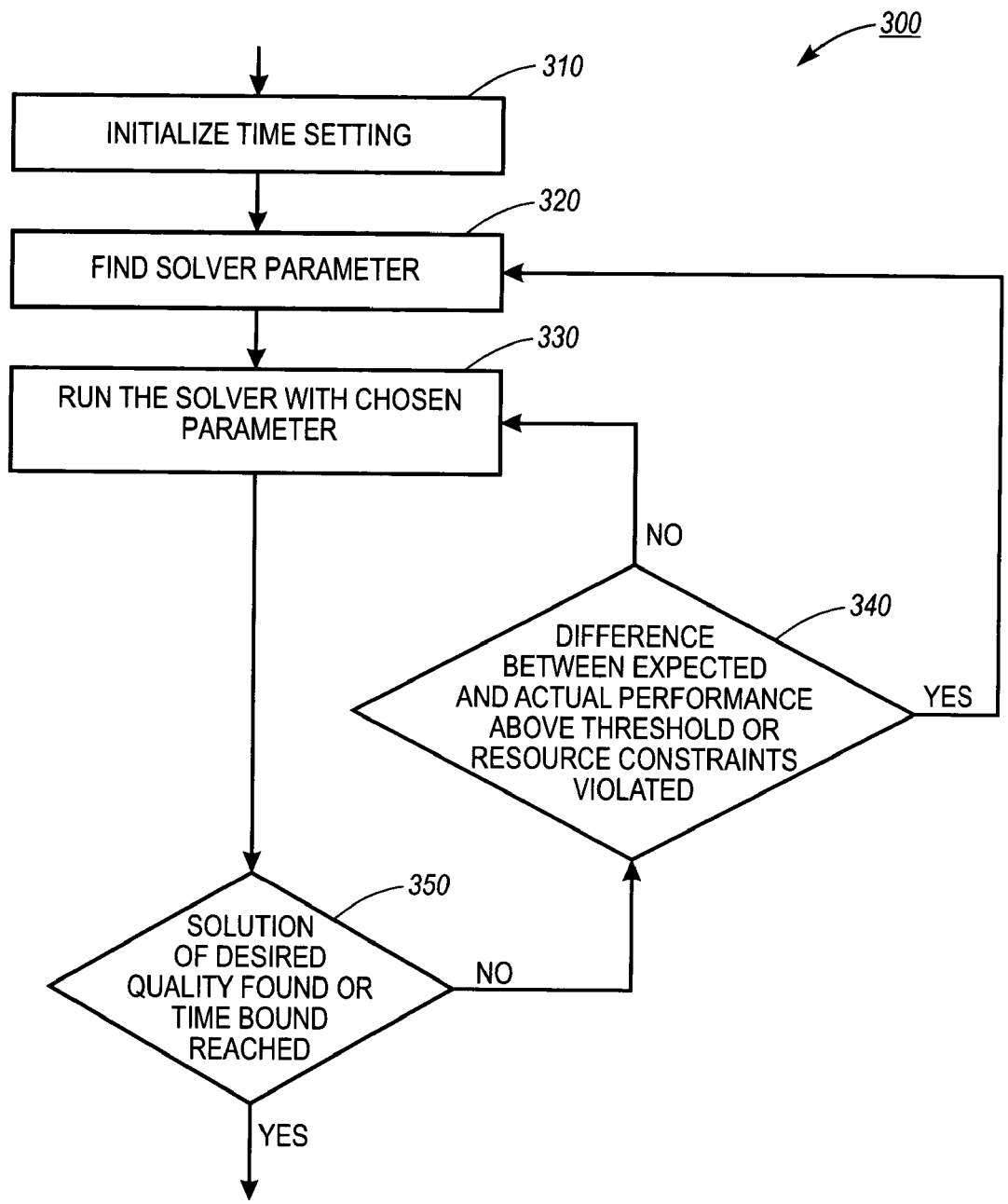
FIG. 3 is a flowchart illustrating an embodiment in which performance, quality, time bound and resource constraint checks are performed.

Turning now to FIG. 3, a flowchart illustrates the operation of the feedback control method. For the embodiment 300 of the method, at 310 the relative time is set to zero and at 320 a solver parameter u is identified such that the expected resource usage satisfies the resource constraints for all times from time t=0 to the time bound td, thus producing the best expected solution quality at time td. At 330 the solver is run with the selected parameter u over a specified interim, for example, for a fixed number of steps or for a fixed amount of time. At 340 and 350 a solution evaluation check is performed, in which the processor reviews various conditions and determination is made as to whether any of the conditions has been satisfied. At 350 a determination is made as to whether a solution of the desired quality has been found or if the time bound has been reached. The solution quality may be defined as appropriate for a problem, with a simple measure being the value of the objective function. (In particular, if the optimum is known to be 0, the objective function value may be interpreted as the solution error.) If either of the conditions is satisfied, the solution is transmitted to the system.

If neither of these conditions is satisfied, the solver then proceeds to 340 and determines whether the difference between the expected and actual performance is above a specified threshold or whether resource constraints have been violated. Performance measures may be defined as appropriate for each solver, with examples being the value of the objective function, the improvement in the value of the objective function, the number of function evaluations required per iteration in a continuous solver, the number of backtracks required per time unit in a depth-first search solver, etc. Resource constraints and usage may be measured in memory units (e.g., bytes) or number of elements, e.g., as used in a backtracking stack.

If none of these conditions is satisfied, the solver returns to 330 and continues running, performing iterations with the selected parameter u until at least one condition in 340 or 350 is satisfied. If either of the conditions in 340 (the difference between the expected and actual performance being above a specified threshold or violations of resource constraints) is satisfied, but neither of the conditions in 350 is satisfied, the solver returns to 320 and a different solver parameter is selected.

One example of pseudo code for feedback control of problem solving presented herein selects solver parameters u such that the best expected solution quality is produced at time td. During solving, if the actual performance differs significantly from the expected performance, the choices in u are reevaluated. As one skilled in the art would appreciate, other approaches could be utilized, for example, a check could be performed for violation of resource constraints. Such alternate approaches are fully contemplated by the specification and scope of the claims herein.

```
set relative time t=0;
repeat
  find u such that qe(u,P,E,td) is minimal and re(u,P,E,s)
    satisfies cr for all times t≦s≦td;
  repeat
    run s(u,P,E) (for a fixed number of steps or for a fixed
      amount of time)
  until (qa≦qmin) or (|pa−pe(u,P,E,t)|>pmax) or (ra violates
    cr) or (t=td);
until (qa≦qd) or (t=td)
```

Here, P is a problem placed in a solver environment E, td is a deadline by which a solution S for P has to be produced, qmin is a desired solution quality, and cr represents resource constraints. Solvers s(u, P, E) are parameterized by control variables u. Expected and actual performance measures are represented as pe(u,P,E,t) and pa, respectively, at time t. Expected and actual resource usage is represented by re(u, P,E,s) and ra, respectively, at time t. Expected and actual solution quality is represented by qe(u,P,E,td) and qa, respectively.

Figure 4:
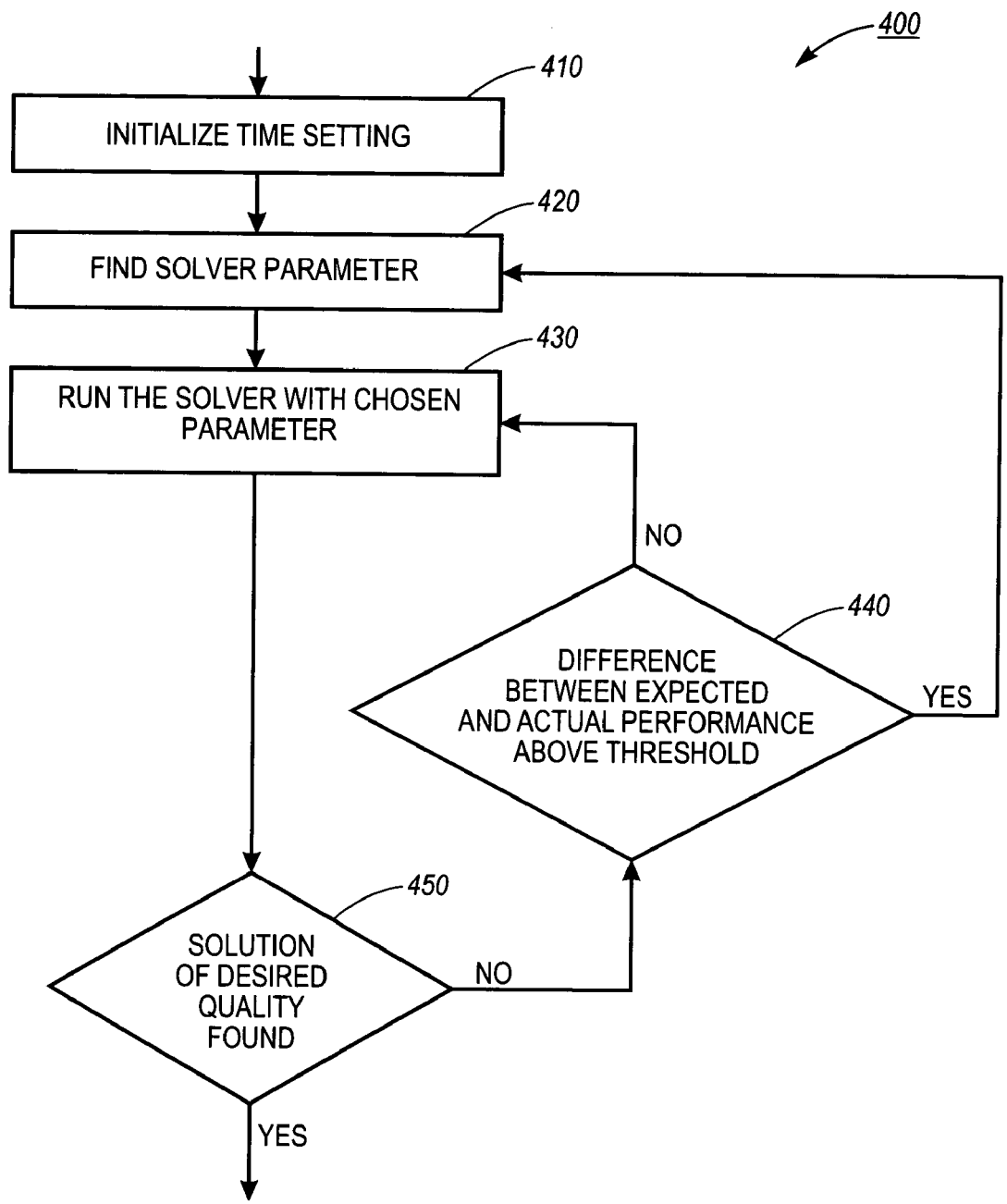
FIG. 4 is a flowchart illustrating an embodiment in which performance and quality are performed.

In another embodiment, shown in FIG. 4, a flowchart illustrates the operation of the feedback control method. For the embodiment 400 of the method, at 410 the relative time is set to zero and at 420 a solver parameter u is identified such that the expected resource usage satisfies the resource constraints for all times from time t=0 to the time bound td, thus producing the best expected solution quality at time td. At 430 the solver is run with the selected parameter u over a specified interim, for example, for a fixed number of steps or for a fixed amount of time. At 440 and 450 a solution evaluation check is performed, in which the processor reviews various conditions and determination is made as to whether any of the conditions has been satisfied. At 450 a determination is made as to whether a solution of the desired quality has been found. The solution quality may be defined as appropriate for a problem, with a simple measure being the value of the objective function. (In particular, if the optimum is known to be 0, the objective function value may be interpreted as the solution error.) If the condition is satisfied, the solution is transmitted to the system.

If the condition is not satisfied, the solver then proceeds to 440 and determines whether the difference between the expected and actual performance is above a specified threshold. Performance measures may be defined as appropriate for each solver, with examples being the value of the objective function, the improvement in the value of the objective function, the number of function evaluations required per iteration in a continuous solver, the number of backtracks required per time unit in a depth-first search solver, etc.

If this condition is not satisfied, the solver returns to 430 and continues running, performing iterations with the selected parameter u until at least one condition in 440 or 450 is satisfied. If the condition in 440 (the difference between the expected and actual performance being above a specified threshold) is satisfied, but the condition in 450 is not satisfied, the solver returns to 420 and a different solver parameter is selected.

Figure 5:
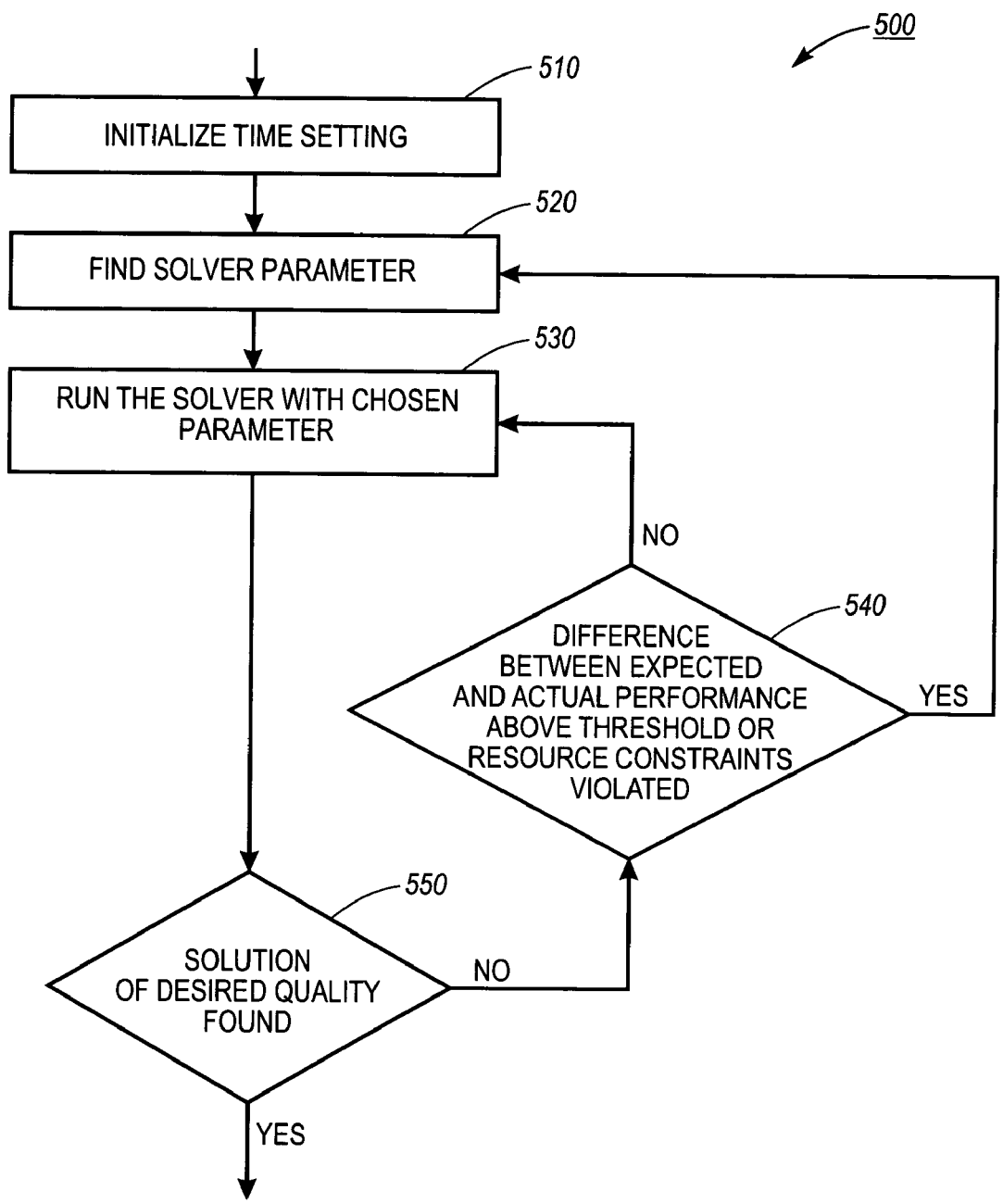
FIG. 5 is a flowchart illustrating an embodiment in which quality, performance, and resource constraint checks are performed.

Turning now to FIG. 5, a flowchart illustrates the operation of the feedback control method according to another embodiment of the subject method. For the embodiment 500 of the method, at 510 the relative time is set to zero and at 520 a solver parameter u is identified such that the expected resource usage satisfies the resource constraints for all times from time t=0 to the time bound td, thus producing the best expected solution quality at time td. At 530 the solver is run with the selected parameter u over a specified interim, for example, for a fixed number of steps or for a fixed amount of time. At 540 and 550 a solution evaluation check is performed, in which the processor reviews various conditions and determination is made as to whether any of the conditions has been satisfied. At 550 a determination is made as to whether a solution of the desired quality has been found. The solution quality may be defined as appropriate for a problem, with a simple measure being the value of the objective function. (In particular, if the optimum is known to be 0, the objective function value may be interpreted as the solution error.) If the condition is satisfied, the solution is transmitted to the system.

If the condition is not satisfied, the solver then proceeds to 540 and determines whether the difference between the expected and actual performance is above a specified threshold or whether resource constraints have been violated. Performance measures may be defined as appropriate for each solver, with examples being the value of the objective function, the improvement in the value of the objective function, the number of function evaluations required per iteration in a continuous solver, the number of backtracks required per time unit in a depth-first search solver, etc. Resource constraints and usage may be measured in memory units (e.g., bytes) or number of elements, e.g., as used in a backtracking stack.

If none of these conditions is satisfied, the solver returns to 530 and continues running, performing iterations with the selected parameter u until at least one condition in 540 or 550 is satisfied. If either of the conditions in 540 (the difference between the expected and actual performance being above a specified threshold or violations of resource constraints) is satisfied, but the condition in 550 is not satisfied, the solver returns to 520 and a different solver parameter is selected.

Figure 6:
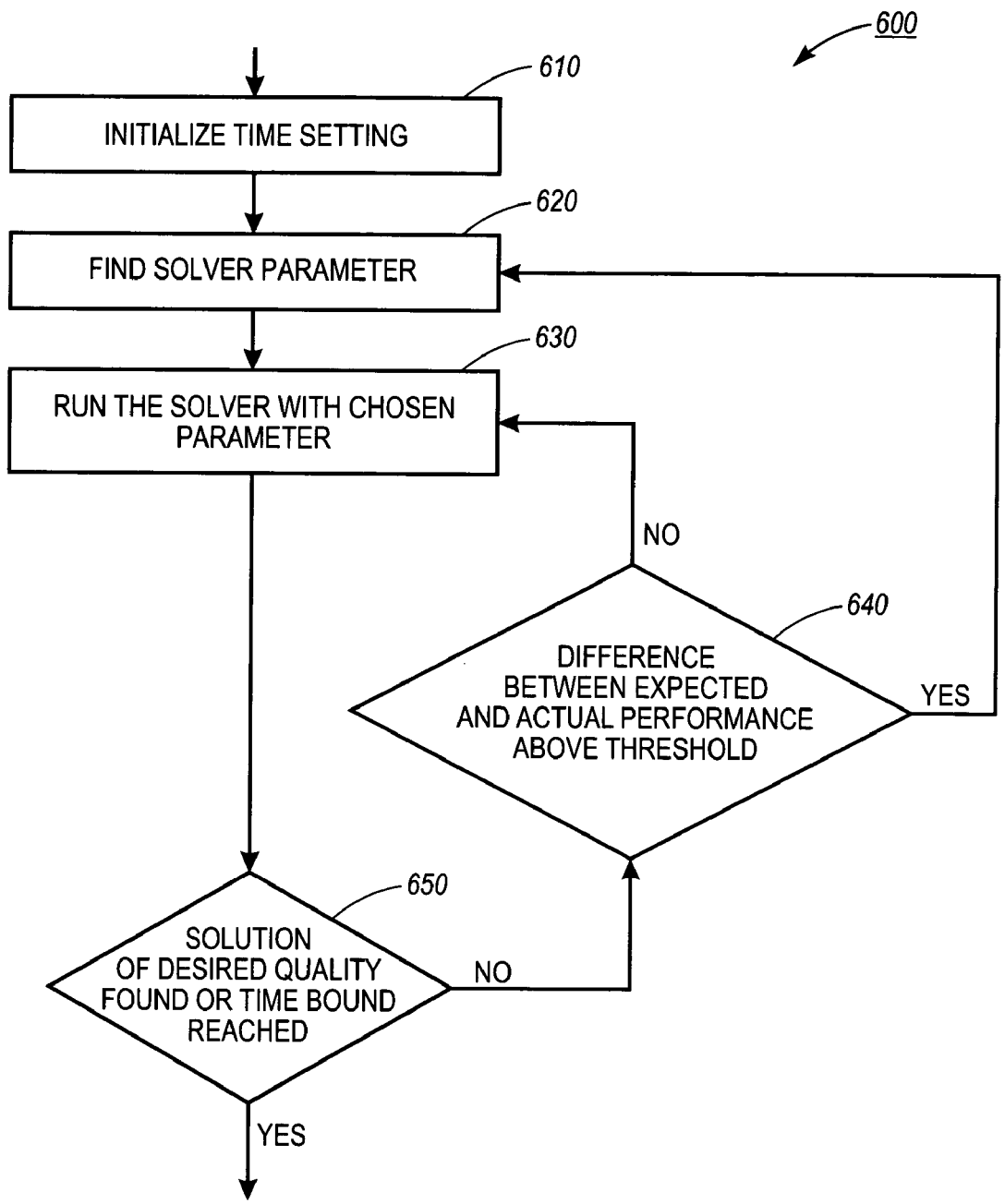
FIG. 6 is a flowchart illustrating an embodiment in which performance, quality, and time bound checks are performed.

Turning now to FIG. 6, a flowchart illustrates the operation of the feedback control method according to another embodiment of the subject method. For the embodiment 600 of the method, at 610 the relative time is set to zero and at 620 a solver parameter u is identified such that the expected resource usage satisfies the resource constraints for all times from time t=0 to the time bound td, thus producing the best expected solution quality at time td. At 630 the solver is run with the selected parameter u over a specified interim, for example, for a fixed number of steps or for a fixed amount of time. At 640 and 650 a solution evaluation check is performed, in which the processor reviews various conditions and determination is made as to whether any of the conditions has been satisfied. At 650 a determination is made as to whether a solution of the desired quality has been found or if the time bound has been reached. The solution quality may be defined as appropriate for a problem, with a simple measure being the value of the objective function. (In particular, if the optimum is known to be 0, the objective function value may be interpreted as the solution error.) If either of the conditions is satisfied, the solution is transmitted to the system.

If neither of these conditions is satisfied, the solver then proceeds to 640 and determines whether the difference between the expected and actual performance is above a specified threshold. Performance measures may be defined as appropriate for each solver, with examples being the value of the objective function, the improvement in the value of the objective function, the number of function evaluations required per iteration in a continuous solver, the number of backtracks required per time unit in a depth-first search solver, etc.

If this condition is not satisfied, the solver returns to 630 and continues running, performing iterations with the selected parameter u until at least one condition in 640 or 650 is satisfied. If the condition in 640 (the difference between the expected and actual performance being above a specified threshold) is satisfied, but neither of the conditions in 650 is satisfied, the solver returns to 620 and a different solver parameter is selected.

Figure 7:
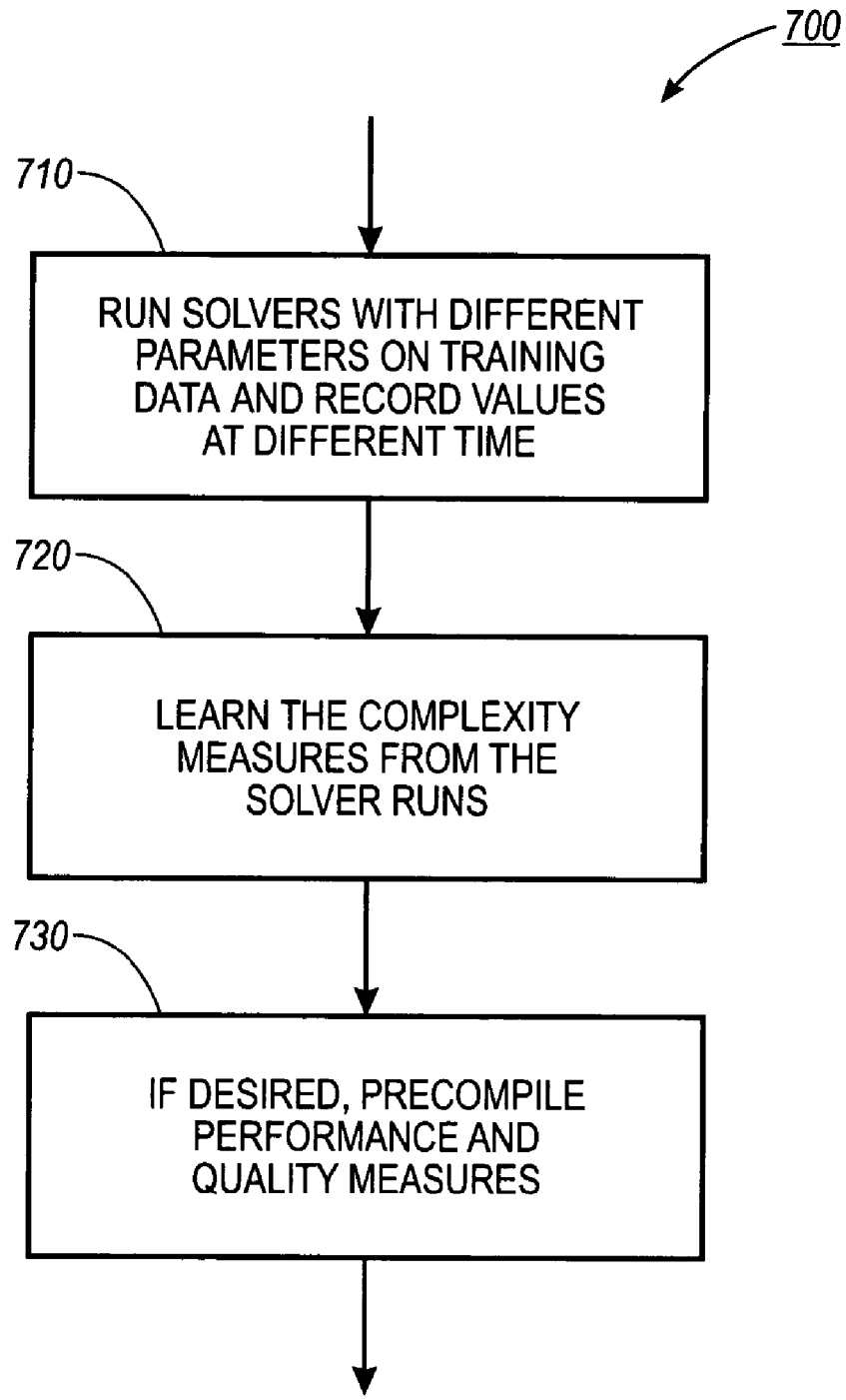
FIG. 7 is a flowchart illustrating threshold parameter learning.

Performance and quality measures may be set off-line, as illustrated in FIG. 7. The method 700 for learning threshold parameters for the solving method begins at 710, where solvers having different parameters u are run on training data P and values at different times are recorded. The training data is a set of problems that are representative of the problems to be solved at run-time. At 720 the complexity measures are learned from the solver runs. This includes recording the solvers' execution times, memory uses, etc., both during a run and accumulated for each run, and aggregated over the training data. These measures of performance and quality correspond to the ones used at runtime to control the solver and determine what parameter values to choose and when to change parameter values, if at all. Finally, at 730 performance and quality measures may be precompiled, if desired, for example by converting them into formats (such as tables) suitable for fast use at run-time. This may be accomplished, for example, by sampling the functions at fixed periodic times (such as 10 intervals from start to expected deadline time td) and creating a lookup table.

While the present method and system have been illustrated and described with reference to specific embodiments, further modification and improvements will occur to those skilled in the art. For example, any of the embodiments described herein could perform an online incremental update of the complexity models of the solvers, or leave a "safety zone", a time slot sufficient to run a local solver, before the deadline to guarantee that a feasible result will be obtained. Also variations of the solver performance, in addition to the average, may be used to determine the solver control parameters. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this method and system are not limited to the particular forms illustrated and that it is intended in the appended claims to embrace all alternatives, modifications, and variations which do not depart from the spirit and scope of this disclosure.

What is claimed is:

1. A method of feedback control of cooperative problem solving for providing resolution of control problems within a computer controlled system having a plurality of subsystems, each having networked sensors and implementation units, with each subsystem having control, monitoring, and fault diagnosis capabilities, wherein the computer controlled system includes an applications module within which reside a control module and a problem solver, wherein the control module receives instructions as to resource constraints and system performance goals and current state data from the implementation units, wherein the problem solver utilizes a plurality of solvers to resolve system performance problems, and wherein the control module transmits commands to the subsystem controllers directing operation of the implementation units, the method comprising:

initializing the time setting;

defining a system performance problem to be solved utilizing the plurality of constraint problem solvers, wherein said problem statement includes system performance constraints, current state of the implementation units, system performance goals, a desired solution quality, and a time deadline for solving the said system performance problem;

selecting not less than one solver parameter value, wherein said solver parameter value satisfies said implementation unit usage constraints within a specified time bound, such that expected solution quality is optimal;

operating the solver with said not less than one selected solver parameter value for a specified interim;

reviewing solver operational conditions, wherein said operational conditions include a performance measure, comprising the difference between expected performance and actual performance, and solution quality;

transmitting a solution of the system performance problem to the control module for formulation of control signals to be transmitted to the subsystem controllers for the implementation units affected if said solution quality condition is satisfied;

continuing to operate the solver with said not less than one selected solver parameter value if said solution quality condition is not satisfied and said difference between expected performance and said actual performance is not above a specified threshold;

selecting not less than one alternate solver parameter value if said solution quality condition is not satisfied and said difference between expected performance and said actual performance is above a specified threshold;

operating the solver with said not less than one alternate solver parameter value for a specified interim; and continuing to operate the solver with said not less than one alternate solver parameter values until said solution quality condition is satisfied.

2. The method for feedback control of cooperative problem solving according to claim 1, wherein said specified interim comprises a specified number of steps.

3. The method for feedback control of cooperative problem solving according to claim 1, wherein said specified interim comprises a specified amount of time.

4. The method for feedback control of cooperative problem solving according to claim 1, wherein said solution quality is defined as the value of the objective function.

5. The method for feedback control of cooperative problem solving according to claim 1, wherein said performance measure comprises the improvement in the value of the objective function.

6. The method for feedback control of cooperative problem solving according to claim 1, wherein said performance measure comprises the number of function evaluations required per iteration in a continuous solver.

7. The method for feedback control of cooperative problem solving according to claim 1, wherein said performance measure comprises the number of backtracks required per time unit in a depth-first search solver.

8. The method for feedback control of cooperative problem solving according to claim 1, wherein said operational conditions further include violation of resource constrains.

9. The method for feedback control of cooperative problem solving according to claim 8, further comprising continuing to operate the solver with said not less than one selected solver parameter value if said solution quality condition is not satisfied, said difference between expected performance and said actual performance is not above a specified threshold, and said resource constraints arc not violated.

10. The method for feedback control of cooperative problem solving according to claim 8, further comprising selecting nor less than one alternate solver parameter value if said solution quality condition is not satisfied and said resource constraints are violated.

11. The method for feedback control of cooperative problem solving according to claim 1, wherein said operational conditions further include reaching a specified time bound.

12. The method for feedback control of cooperative problem solving according to claim 11, further comprising continuing to operate the solver with said not less than one selected solver parameter value if said solution quality condition is not satisfied, said time bound is not reached, and said difference between expected performance and said actual performance is not above a specified threshold.

13. The method for feedback control of cooperative problem solving according to claim 11, further comprising transmitting a solution to the system if said time bound is reached.

14. The method for feedback control of cooperative problem solving according to claim 11, further comprising selecting not less than one alternate solver parameter value if said solution quality condition is not satisfied, said time bound is not reached, and said difference between expected performance and said actual performance is above a specified threshold.

15. The method for feedback control of cooperative problem solving according to claim 1, wherein said operational conditions further include reaching a specified rime bound and violation of resource constraints.

16. The method for feedback control of cooperative problem solving according to claim 15, further comprising transmitting a solution to the system if said solution quality condition is satisfied or said time bound is reached.

17. The method for feedback control of cooperative problem solving according to claim 15, further comprising continuing to operate the solver with said not less than one selected solver parameter value if said solution quality condition is not satisfied, said time bound is not reached, said difference between expected performance and said actual performance is not above a specified threshold, and said resource constraints are not violated.

18. The method for feedback control of cooperative problem solving according to claim 15, further comprising selecting not less than one alternate solver parameter value if said solution quality condition is not satisfied, said time bound is not reached, and said resource constraints have been violated.

19. A system of feedback control of cooperative problem solving for providing resolution of control problems within a computer controlled system having a plurality of subsystems, each having networked sensors and implementation units, with each subsystem having control, monitoring, and fault diagnosis capabilities, wherein the computer controlled system includes an applications module within which reside a control module and a problem solver, wherein the control module receives instructions as to resource constraints and system performance goals and current state data from the implementation units, wherein the problem solver utilizes a plurality of solvers to resolve system performance problems, and wherein the control module transmits commands to the subsystem controllers directing operation of the implementation units, the system comprising:

means for initializing the time setting;

defining a system performance problem to be solved utilizing the plurality of constraint problem solvers, wherein said problem statement includes system performance constraints, current stare of the implementation units, system performance goals, a desired solution quality, and a time deadline for solving the said system performance problem;

means for selecting not less than one solver parameter value, wherein said solver parameter value satisfies said implementation unit usage constraints within a specified time bound, such that expected solution quality is optimal;

means for operating the solver with said not less than one selected solver parameter value for a specified interim;

means for reviewing solver operational conditions, wherein said operational conditions include a performance measure, comprising the difference between expected performance and actual performance, and solution quality;

means for transmitting a solution of the system performance problem to the control module for formulation of control signals to be transmitted to the subsystem controllers for the implementation units affected if said solution quality condition is satisfied;

means for continuing to operate the solver with said not less than one selected solver parameter value if said solution quality condition is not satisfied and said difference between expected performance and said actual performance is not above a specified threshold;

means for selecting not less than one alternate solver parameter value if said solution quality condition is not satisfied and said difference between expected performance and said actual performance is above a specified threshold;

means for operating the solver with said not less than one alternate solver parameter value for a specified interim; and means for continuing to operate the solver with said not less than one alternate solver parameter values until said solution quality condition is satisfied.

20. The system for feedback control of cooperative problem solving according to claim 19, wherein said operational conditions further include violation of resource constraints.

21. The system for feedback control of cooperative problem solving according to claim 20, further comprising means for continuing to operate the solver with said not less than one selected solver parameter value if said solution quality condition is not satisfied, said difference between expected performance and said actual performance is not above a specified threshold, and said resource constraints are not violated.

22. The system for feedback control of cooperative problem solving according to claim 20, further comprising means for selecting not less than one alternate solver parameter value if said solution quality condition is not satisfied and said resource constraints are violated.

23. The system for feedback control of cooperative problem solving according to claim 19, wherein said operational conditions further include reaching a specified time bound.

24. The system for feedback control of cooperative problem solving according to claim 23, further comprising means for continuing to operate the solver with said got less than one selected solver parameter value if said solution quality condition is not satisfied, said time bound is not reached, and said difference between expected performance and said actual performance is not above a specified threshold.

25. The system for feedback control of cooperative problem solving according to claim 23, further comprising means for transmitting a solution to the system if said time bound is reached.

26. The system for feedback control of cooperative problem solving according to claim 23, further comprising means for selecting not less than one alternate solver parameter value if said solution quality condition is not satisfied, said time bound is not reached, and said difference between expected performance and said actual performance is above a specified threshold.

27. The system for feedback control of cooperative problem solving according to claim 19, wherein said operational conditions further include reaching a specified time bound and violation of resource constraints.

28. The system for feedback control of cooperative problem solving according to claim 27, further comprising means for transmitting a solution to the system if said solution quality condition is satisfied or said time bound is reached.

29. The system for feedback control of cooperative problem solving according to claim 27, further comprising means for continuing to operate the solver with said not less than one selected solver parameter value if said solution quality condition is not satisfied, said time bound is not reacted, said difference between expected performance and said actual performance is not above a specified threshold, and said resource constraints are not violated.

30. The system for feedback control of cooperative problem solving according to claim 27, further comprising means for selecting not less than one alternate solver parameter value if said solution quality condition is not satisfied, said time bound is not reached, and said resource constraints have been violated.

31. An article of manufacture comprising a computer usable medium having computer readable program code embodied in said medium which, when said program code is executed by said computer, causes said computer to perform method steps for of feedback control of cooperative problem solving for providing resolution of control problems within a computer controlled system having a plurality of subsystems, each having networked sensors and implementation units, with each subsystem having control, monitoring, and fault diagnosis capabilities, wherein the computer controlled system includes an applications module within which reside a control module and a problem solver, wherein the control module receives instructions as to resource constraints and system performance goals and current state data from the implementation units, wherein the problem solver utilizes a plurality of solvers to resolve system performance problems, and wherein the control module transmits commands to the subsystem controllers directing operation of the implementation units, the method comprising:

initializing the time setting;

defining a system performance problem to be solved utilizing the plurality of constraint problem solvers, wherein said problem statement includes system performance constraints, current state of the implementation unit, system performance goals, a desired solution quality, and a time deadline for solving the said system performance problem;

selecting not less than one solver parameter value, wherein said solver parameter value satisfies said implementation unit usage constraints within a specified time bound, such that expected solution quality is optimal;

operating the solver with said not less than one selected solver parameter value for a specified interim;

reviewing solver operational conditions, wherein said operational conditions include a performance measure, comprising the difference between expected performance and actual performance, and solution quality;

transmitting a solution of the system performance problem to the control module for formulation of control signals to be transmitted to the subsystem controllers for the implementation units affected if said solution quality condition is satisfied;

continuing to operate the solver with said not less than one selected solver parameter value if said solution quality condition is not satisfied and said difference between expected performance and said actual performance is not above a specified threshold;

selecting not less than one alternate solver parameter value if said solution quality condition is not satisfied and said difference between expected performance and said actual performance is above a specified threshold;

operating the solver with said not less than one alternate solver parameter value for a specified interim; and continuing to operate the solver with said not less than one alternate solver parameter values until said solution quality condition is satisfied.

* * * * *